US010693804B1

(12) United States Patent
Gladney

(10) Patent No.: US 10,693,804 B1
(45) Date of Patent: Jun. 23, 2020

(54) USING CAPTURED CONFIGURATION CHANGES TO ENABLE ON-DEMAND PRODUCTION OF GRAPH-BASED RELATIONSHIPS IN A CLOUD COMPUTING ENVIRONMENT

(71) Applicant: Capital One Services, LLC, McLean, VA (US)

(72) Inventor: Matthew Gladney, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/702,993

(22) Filed: Dec. 4, 2019

(51) Int. Cl.
| H04L 12/911 | (2013.01) |
| H04L 12/919 | (2013.01) |
| G06F 16/903 | (2019.01) |
| G06F 16/901 | (2019.01) |

(52) U.S. Cl.
CPC .......... *H04L 47/765* (2013.01); *G06F 16/903* (2019.01); *G06F 16/9024* (2019.01); *H04L 47/783* (2013.01); *H04L 47/821* (2013.01); *H04L 47/822* (2013.01); *H04L 47/828* (2013.01)

(58) Field of Classification Search
CPC .. G06F 16/9024; G06F 16/903; G06F 16/258; G06F 16/335; G06F 21/56; G06F 8/60; H04L 47/765; H04L 47/783; H04L 47/821; H04L 47/822; H04L 47/828; H04L 47/823; H04L 43/045; H04L 43/0876; G06Q 30/0201; G06Q 30/06
See application file for complete search history.

(56) References Cited

U.S. PATENT DOCUMENTS

| 10,225,259 | B2 | 3/2019 | Plichta et al. | |
|---|---|---|---|---|
| 10,237,294 | B1 | 3/2019 | Zadeh et al. | |
| 2018/0012269 | A1* | 1/2018 | O'Sullivan | G06Q 30/06 |
| 2018/0027006 | A1 | 1/2018 | Zimmermann et al. | |
| 2018/0131585 | A1* | 5/2018 | Bliesner | H04L 43/045 |
| 2018/0219792 | A1* | 8/2018 | Weber | H04L 47/823 |
| 2018/0248895 | A1 | 8/2018 | Watson et al. | |
| 2019/0073714 | A1 | 3/2019 | Fidanza et al. | |
| 2019/0149574 | A1* | 5/2019 | Thomas | H04L 63/0236 |
| 2019/0158524 | A1* | 5/2019 | Zadeh | H04L 63/1425 |
| 2019/0245894 | A1* | 8/2019 | Epple | G06F 21/56 |
| 2019/0334856 | A1* | 10/2019 | Tanaya | G06F 16/335 |
| 2019/0355031 | A1* | 11/2019 | Cella | G06Q 30/0202 |
| 2019/0377570 | A1* | 12/2019 | Govindaraju | G06F 8/60 |
| 2019/0392070 | A1* | 12/2019 | Johnson | G06F 16/258 |
| 2020/0036624 | A1* | 1/2020 | Michael | H04L 43/0876 |

* cited by examiner

*Primary Examiner* — Le H Luu
(74) *Attorney, Agent, or Firm* — Sterne, Kessler, Goldstein & Fox P.L.L.C.

(57) ABSTRACT

Described herein is a system for automatically capturing configuration changes to the cloud computing resources. The system for automatically capturing configuration changes may detect changes to configurations of cloud computing resources across the geographic regions, in real-time. The changes may be stored in a central data storage device instantiated by a central cloud computing account. Furthermore, a relationship graph indicating the relationships between the different cloud computing resources may be generated.

20 Claims, 7 Drawing Sheets

USING CAPTURED CONFIGURATION CHANGES TO ENABLE ON-DEMAND PRODUCTION OF GRAPH-BASED RELATIONSHIPS IN A CLOUD COMPUTING ENVIRONMENT

BACKGROUND

Cloud computing may be the on-demand availability of computer system resources, especially data storage and computing power, without direct active management by the user. The computer system resources may be data centers available to many users over the Internet. They may have functions distributed over multiple locations from central servers or designate edge servers.

Cloud computing environments may provide computing services for storing, processing, and managing data over a networked environment. Cloud computing environments, such as an AMAZON Web Services (AWS) environment available from Amazon Inc. of Seattle, Wash., may include hundreds of thousands of cloud computing resources. Cloud computing resources may include servers, data storage repositories, computing services, communication platforms, virtual development environments, software, and/or the like within a cloud computing environment. Various cloud computing accounts utilizing the cloud computing resources may need the current configuration of the cloud computing resources at all times. The configuration of the cloud computing resources may include server names, database names, security settings, the location of the cloud computing resources, network address of the cloud computing resources, and/or the like.

To determine the current configuration of the cloud computing resources, cloud computing accounts have conventionally had to poll the cloud computing resources individually. Polling-based models may create duplicative efforts to retrieve the same data from the cloud computing resources. Exhaustive Application Program Interface (API) queries may result in a rate limit or throttling issues. Systems performing their normal operations on or with the respective cloud computing resources may be denied or delayed. This is because polling just to retrieve the current configuration of these various cloud computing resources can starve API access of these systems performing their operations using the cloud computing resources.

Furthermore, these cloud computing resources are related to each other. For example, a cloud computing resource may interface with another cloud computing resource. Alternatively, a cloud computing resource may govern the rules of data transmission of another cloud computing resource. Navigating the relationships between cloud computing resources is inefficient, time-consuming, and cumbersome. Conventionally, the relationships between cloud computing resources are stored in a flat structure. The flat structure does not define relationships between the cloud computing resources. To define a hierarchical relationship between the cloud computing resources, this structure forces a user to execute an API call for each cloud computing resource and then infer further relationships between the cloud computing resources based on the results of the API calls. This compounds the inefficiencies in retrieving data.

Methods and systems are needed to observe the current and historical configuration of computing resources in a way that is more efficient and does not starve API access to these cloud computing resources from other processes.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION OF THE INVENTION

Figure 1:
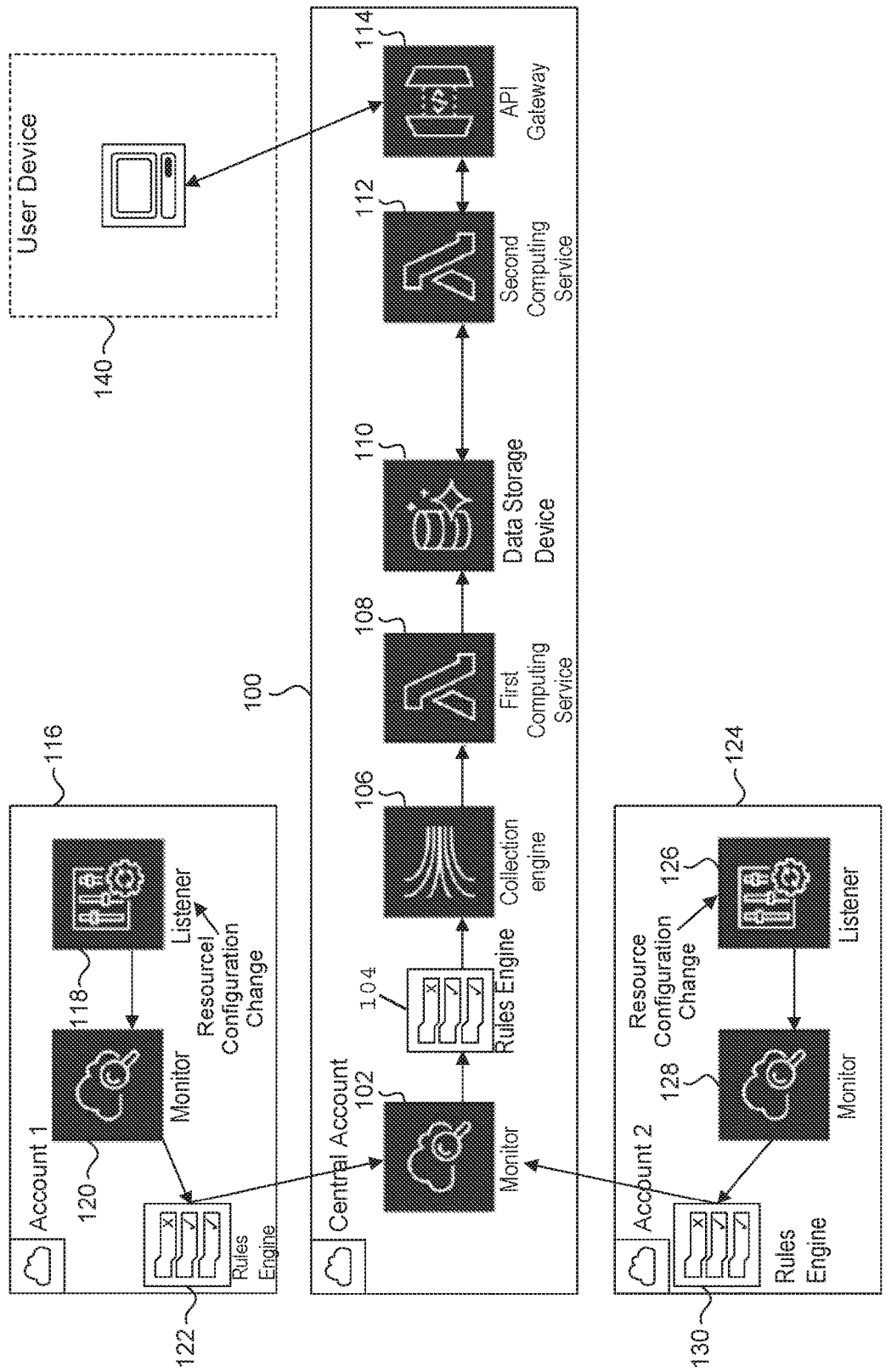
FIG. 1 illustrates cloud computing accounts according to an embodiment.

A cloud computing environment may include multiple cloud computing resources distributed across various geographic regions. The cloud computing environment may further include cloud computing accounts which utilize particular cloud computing resources. Each of the cloud computing accounts may track the configuration of the particular cloud computing resources utilized by the respective cloud computing account. However, to determine the current configuration of a cloud computing resource, a device may either need to poll individually an Application Program Interface (API) of the cloud computing resource or a cloud computing account utilizing the particular cloud computing resource, in order to retrieve a representative object (i.e., JSON) of the cloud computing resource. In this regard, a single access point may receive a voluminous number of queries to provide data regarding different cloud computing resources or cloud computing accounts. The API of the cloud computing account may only be able to receive a maximum number of calls at a time. Furthermore, each of the calls must be authorized on a per-account and per-region basis. Consequently, the process to determine the configuration changes may be subject to failure when the limit has been exceeded. Monitoring and determining configuration changes may be complex when done by polling. For example, ad hoc polling software/logic can be error prone and require large/expensive re-executions of applications. Ad hoc scripting or CLI calls can be error prone and non-deterministic. A user may have to determine how often to poll the API based on a maximum amount of API calls permitted and number of resources under observation. The limit to how many times one may poll the API is referred to as a rate limit (i.e., rate of polling). Individual polling of each API of the cloud computing resource and/or cloud computing account, to establish resource relationships, can grow exponentially, as the use of the cloud computing account increases or the number of cloud computing resources increase.

As an example, conventionally, to remove a port from any security group using the port, one would need to know what security groups are using the port and which cloud computing resources are using the security group. This may be defined as the "blast radius" of the change. There can be several different cloud computing resources of different types and categories using the security group, whose software require the port. One would have to inventory all of the security groups, interrogate their configurations for that port, and then interrogate all cloud computing resources that could potentially be using any security group in order to determine whether the cloud computing resource is using any of the matching security groups. Executing multiple queries can be a long and burdensome process that utilizes a lot of operational resources of the cloud computing environment.

Described herein is a system to automate the capture of configuration changes to the cloud computing resources for use in a graph-based query system. To automatically capture configuration changes, the system may detect a change or addition (i.e., on-boarding new cloud computing resources) to configurations of cloud computing resources across the geographic regions and account perimeters within those regions, in near real-time. Once detected, the system may store the detected changes in a central data storage device. The data storage device may be a relational database that can be queried. Alternatively, the data storage device could a NoSQL or other storage system capable of handling filtering operations. This allows users to query an independently managed API which is capable of returning information regarding all of the current and historical configurations of the cloud computing account, rather than having to poll APIs of individual cloud computing resources or accounts. In this way, the system described herein can store all the cloud computing configurations in a central system for storage and extraction, separate from AWS account systems. In this regard, a user does not have to poll different cloud computing accounts or resources. Furthermore, the system described herein consolidates events into a single central system for processing as opposed to processing in the cloud computing environment that detected the event. The system may also use comprehensive configuration objects so that there is greatly reduced need to use APIs to enrich the configuration data. By storing the configuration information, a central repository prevents unnecessary polling of APIs of individual cloud computing resources. The system also provides a graph-based interface layer to extract the data from the central data repository. This extraction simplifies the ability to establish relationships between cloud computing resources.

Furthermore, in response to receiving a request to retrieve information for a specified cloud computing resource, the system generates a relationship graph indicating the relationships between the different cloud computing resources based on data stored in the database instantiated by the central account. The relationship graph captures the configuration of the different cloud computing resources, such that polling every parent cloud computing resource of the specified cloud computing resources is not necessary. In this way, the system disclosed herein can solve the technical problem of having to identify related cloud computing resources based on a set of criteria through a uniform set of capabilities for each resource.

FIG. 1 illustrates cloud computing accounts according to an embodiment. The cloud computing environment may be a distributed computing environment configured to provide services. A cloud computing environment may provide services through a service-oriented architecture. As an example, the cloud computing environment may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

The cloud computing environment may include multiple cloud computing resources, such as servers, data storage repositories, computing services, communication platforms, virtual development environments, software, and/or the like. The cloud computing resources may be distributed across multiple geographic regions. Each of the cloud computing resources may be related to other cloud computing resources. For example, a server of the cloud computing environment may utilize specified data storage repositories in the cloud computing environment.

The cloud computing environment may include various cloud computing regions. Various cloud computing regions may be accessed by various cloud computing accounts. With reference to FIG. 1, a cloud computing estate may include multiple different cloud computing environments. The cloud computing estate may be associated with a central cloud computing account 100, first cloud computing account 116, and a second cloud computing account 124.

The central cloud computing account 100 may be in communication with each of the cloud computing accounts, such as the first cloud computing account 116 and the second cloud computing account 124. The central cloud computing account 100 may instantiate a second monitoring service 102 (e.g., AMAZON Web Services CloudWatch), a rules engine 104 (e.g., which may also be provided by AMAZON Web Services CloudWatch), a collection engine 106 (e.g., AMAZON Kinesis developed by Amazon Inc. of Seattle, Wash.), a first computing service 108 (e.g., AMAZON Web Services Lambda developed by Amazon Inc. of Seattle, Wash.), a data storage device 110 (e.g., AMAZON Aurora developed by Amazon Inc. of Seattle, Wash.), a second computing service 112 (e.g., AMAZON Web Services Lambda), and an API Gateway 114.

The data storage device 110 may store configuration information about cloud computing resources. The configuration information may include relationships between the cloud computing resources and security access information for the cloud computing resources. The configuration information may be used to build a relationship graph of the cloud computing resources as will be described herein.

A cloud computing estate may identify and authenticate the first and second cloud computing accounts 116 and 124 so that the respective cloud computing account may access and utilize the respective cloud computing resources being executed in the cloud computing estate. The first cloud computing account 116 is a cloud computing account configured to utilize a specified set of cloud computing resources. The second cloud computing account 124 is a cloud computing account configured to utilize a different set of cloud computing resources. The cloud computing resources may be distributed across geographic regions.

The first cloud computing account 116 may use a first set of cloud computing resources, and the second cloud computing account 124 may use a second set of cloud computing resources. Each of the first and second set of cloud computing resources may include some of the same type of cloud computing resources.

The first and second cloud computing accounts 116 and 124 may each instantiate a listener 118 and 126 (e.g., AMAZON Web Services Config developed by Amazon.com, Inc. of Seattle, Wash.), a first monitoring service 120 and 128 (e.g., AMAZON Web Services CloudWatch developed by Amazon Inc. of Seattle, Wash. or AMAZON CloudTrail developed by Amazon Inc. of Seattle, Wash.), and a rules engine 122 and 130.

The listener 118 and/or 126 may audit and evaluate configuration of the cloud computing resources. For example, the listener 118 and/or 126 continuously monitors and records the current configuration of the cloud computing resources. The listener 118 and/or 126 may provide the current configuration of any cloud computing resource as needed. As an example, a user may configure the listener 118 to monitor a set of cloud computing resources. Alternatively, the listener 118 may discover the cloud computing resources utilized by the first cloud computing account 116. The listener 118 may generate a configuration item for each of the cloud computing resources that the listener 118 is monitoring. The configuration item may include metadata, attributes, relationships, current configuration, and related events. The configuration item may be a data structure that includes attributes associated with the configuration of the cloud computing account at a given point in time. The listener 118 may generate a new configuration item each time a configuration of a cloud computing resource changes. The listener 126 may monitor the configuration of the cloud computing resources utilized by the second cloud computing account 124.

The first monitoring service 120 and 128 instantiated by the first and second cloud computing accounts 116 and 124 and the second monitoring service 102 instantiated by the central cloud computing account 100 may collect and track metrics, monitor log files, and react to changes to the cloud computing resources. The first monitoring service 120 and 128 may be executed on the cloud by the first or second cloud computing account 116 and 124. Alternatively, or in addition to, the first monitoring service 120 and 128 may be executed in the cloud computing system and may be assigned to the first or second cloud computing account 116 or 124, respectively.

The first monitoring service 120 and 128 may react to changes to the cloud computing resources utilized by the first and second cloud computing accounts 116, 124, respectively. The first monitoring service 120 and 128 may capture metrics representing time-ordered data points about the cloud computing resources. The first monitoring service 120 and 128 may receive data from the listener 118 and/or 126 indicating the configuration changes to the cloud computing resources. The first monitoring service 120 and 128 may monitor the cloud computing resources based on the received data from the listener 118 and/or 126. The first monitoring service 120 and 128 may generate an event based on the data received from the listener 118 and/or 126.

The rules engine 122 and 130 instantiated by the first and second cloud computing accounts 116 and 124 and the rules engine 104 instantiated by the central cloud computing account 100 may evaluate and forward a received event from the first monitoring services 120 and 128 or the second monitoring service 102. The rules engine 122 and 130 may be executed on the cloud by the first or second cloud computing account 116 and 124. Alternatively, or in addition to, the rules engine 122 and 130 may be executed in the cloud computing system and may be assigned to the first or second cloud computing account 116 or 124, respectively. As an example, the rules engine 122 and 130 may store rules regarding whether to forward an event to the central cloud computing account 100. The rules may determine whether an event qualifies as a subscribed configuration change of a cloud computing resource to make sure that the correct events are forwarded to the central cloud computing account.

In an embodiment, the listener 118 may detect a change in configuration to a cloud computing resource utilized by the first cloud computing account 116. The listener 118 may store data describing the change. The listener 118 may convert the change into an event and emit the event to the first monitoring service 120. The first monitoring service 120 may receive the event and may forward the event to the rules engine 122. The rules engine 122 may evaluate the event against specified rules. As an example, the rules engine 122 may determine that the event includes a valid configuration change of the cloud computing resource. In response to verifying the event, the rules engine 122 may forward the event to the central cloud computing account 100. It can be appreciated that the second cloud computing account 124 may monitor, detect, and forward the changes to the configuration for the cloud computing resources utilized by the second cloud computing account 124 similarly to as described above with respect to the first cloud computing account 116.

The second monitoring service 102 may receive the event and forward the event to the rules engine 104. The rules engine 104 may verify and forward the event based on a specified set of rules. The rules engine 104 may forward the event to a collection engine 106. The collection engine 106 may store the event for a specified amount of time. The collection engine 106 instantiated by the central cloud computing account 100 may collect streamed event data. The collection engine 106 may store the collected streamed event data for a specified amount of time (e.g., 24 hours). The collection engine 106 may receive identifiable records of data in a stream. The collection engine 106 may be executed in the cloud computing system and may be designated to be executed by to the central cloud computing account 100.

The first computing service 108 may continuously (or periodically) check the collection engine 106 for new events. In response to detecting a new event, the first computing service 108 may extract the data of the new event. The first computing service 108 and the second computing service 112 may each be a computing platform activated by an event-driven workstream. In response to receiving events, the first and/or second computing services 108, 112 may execute code. In this configuration, in response to a new event, the first computing service 108 may determine whether the change of the configuration to the type of cloud computing resource has occurred at a prior point in time, based on the data of the event from the collection engine 106. In response to determining that the change of the configuration to the type of cloud computing resource has occurred at a prior point in time, the first computing service 108 may instruct the data storage device 110 to store the data of the change of the configuration to the cloud computing resource in an existing record collection related to that type of cloud computing resource in the data storage device 110, which corresponds to the particular change of the configuration to the cloud computing resource. In response to determining that the change of the configuration to the type of cloud computing resource has not occurred at a prior point in time, the first computing service 108 may instruct the data storage device 110 to store the data of the change in the configuration to the cloud computing resource in a new record collection related to that type of cloud computing resource. The data storage device 110 may be a relational database organized by tables representing collections of distinct resource types. The data in the new table may be stored in a JSONB format. Alternatively, the data could be stored in an additional format compatible for efficient interrogation and filtering. The data storage device 110 may be in communication with the first and second computing services 108 and 112.

The central cloud computing account 100 may receive queries or calls for a request for configuration information (or object) for a cloud computing resource. In response to receiving the request for the configuration information for the cloud computing resource, the second computing service 112 may determine relationships between the cloud computing resource for which the configuration information is requested and other cloud computing resources by retrieving and using the configuration information of the cloud computing resources stored in the data storage device 110. A relationship between cloud computing resources defines how cloud computing resources interact with one another. An example of a relationship between cloud computing resources is relationship between a server and a database. A server may interface with a specific database to store and retrieve data. The second computing service 112 may generate a relationship graph indicating the different relationships between the cloud computing resource for which the configuration has been changed and other cloud computing resources using the retrieved configuration information of the cloud computing resources.

A relationship graph is a graphical representation indicating the relationships between different cloud computing resources. As an example, the relationship graph may be generated by a GraphQL engine in a GraphQL (GRAPHQL developed by Facebook of Menlo Park, Calif.) format. GraphQL is a query language for APIs. The GraphQL engine may model relationships between the cloud computing resources. A relationship graph can be used to determine a relationship between different cloud computing resources using information about a single cloud computing resource, without having to generate multiple client side requests in preference for a single query submission to the API. Second computing service 112 may determine the configuration information requested for the cloud computing resource for the relationship graph. Second computing service 112 may communicate the relationship graph indicating the configuration information of the cloud computing resource through the API gateway 114.

In an embodiment, the second computing device 112 may be unable to retrieve the complete configuration information of a cloud computing resource from the data storage device 110. The second computing service 112 may poll or query a secondary source (e.g., API, secondary system, data store, and/or the like) to retrieve an attribute of the complete computing resource. The second computing service 112 may use the attribute to retrieve the complete configuration of the cloud computing resource from the data storage device 110 using the attribute. Second computing service 112 may use the complete configuration information of the cloud computing resource to build the relationship graph.

Figure 2:
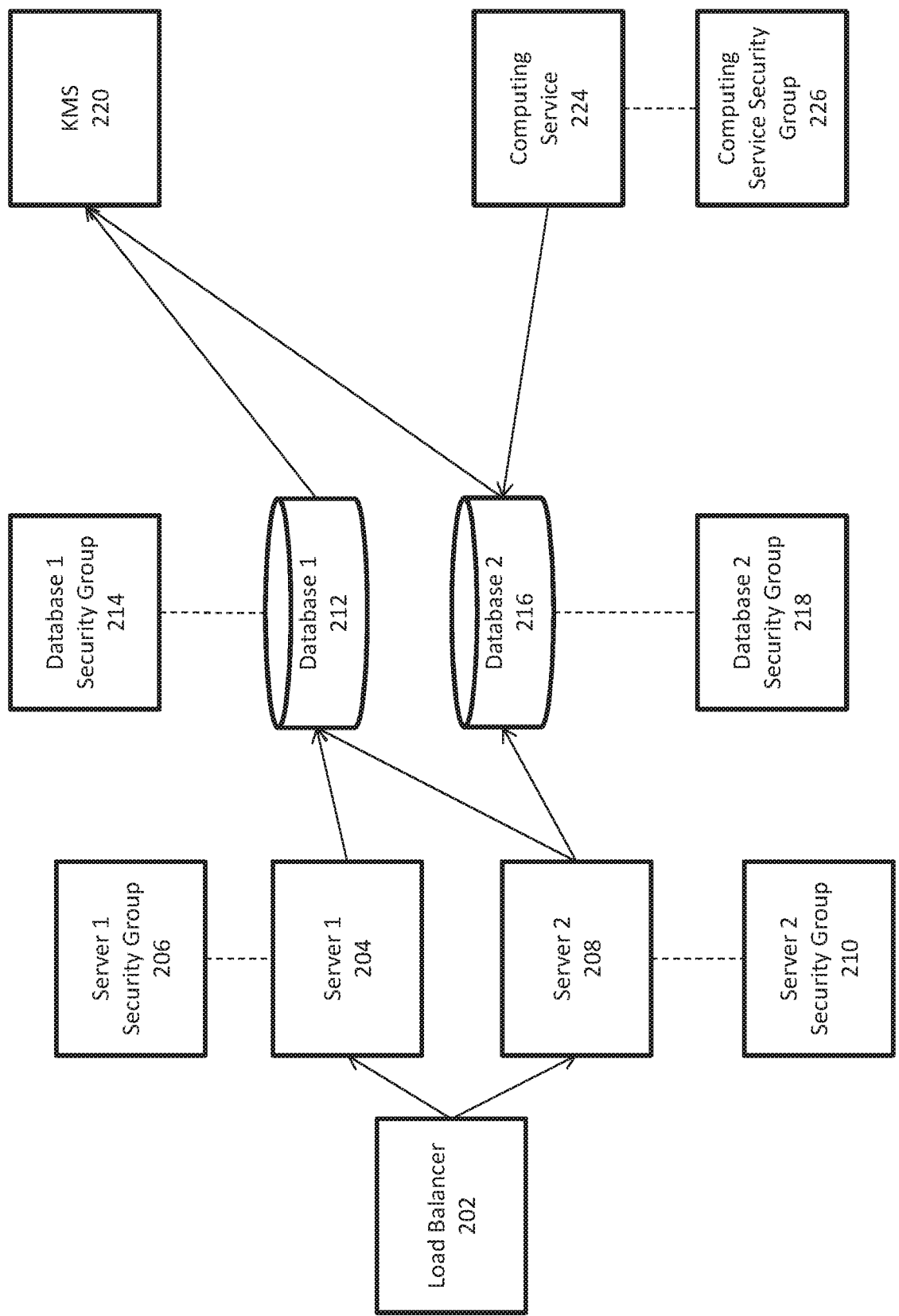
FIG. 2 illustrates an example relationship graph according to an embodiment.

FIG. 2 illustrates an example relationship graph 200 according to an embodiment. Relationship graph 200 may include cloud computing resources such as, a load balancer 202, server 1 204, server 1 security group 206, server 2 208, server 2 security group 210, database 1 212, database 1 security group 214, database 2 216, database 2 security group 218, key management service (KMS) 220, computing service 224, and computing service security group 226. Load balancer 202 may have an explicit relationship with the cloud computing resources as a platform configuration. The load balancer may forward traffic to the cloud computing resources per the configuration rules of various security groups (e.g., server 1 security group 206, server 2 security group 210, database 1 security group 214, database 2 security group 218, and computing service security group 226) Server 1 204 may have access to database 1 212. Server 2 may have access to database 1 212 and database 2 216. Database 1 212 may utilize KMS 220 using an identity and access management (IAM) permission. Database 2 216 may utilize KMS 220. Computing service 224 may have access to database 2 216. Computing service security group 226 may govern whether computing service 224 may have outbound access to database 2 216. Database 2 security group 218 may govern whether the database 2 216 may receive inbound network traffic from computing service 224. Server 1 security group 206 may govern whether server 1 204 may have outbound traffic access to database 1 212. Each of the security groups may include inbound and outbound rules such as inbound or outbound port configurations. Inbound port configurations may govern the port configurations from which a given cloud computing resource may receive information. Outbound port configurations may govern the port configurations to which a given cloud computing resource may transmit information. An outbound port configuration of a cloud computing resource may correspond with an inbound port configuration of different cloud computing resource, allowing the two cloud computing resources to communicate. Server 2 security group 210 may govern whether server 2 may have outbound traffic access to database 1 212 and database 2 216. Database 1 security group 214 may govern whether database 1 212 may receive inbound traffic from server 1 204 and server 2 208. In some embodiments, cloud computing resources may share security groups.

As a non-limiting example, the user device 140 may transmit a query request to determine whether server 1 204 has access to any database in the account. The query request may include the server ID or other information about server 1 204. In response to receiving the query request, the second computing service 112 may execute a query to retrieve information to determine if there are any databases server 1 204 has access to. Second computing service 112 may first retrieve the configuration of server 1 204 using the server ID or other information about server 1 204. The configuration of server 1 204 may include a server 1 security group 206 ID. Second computing service 112 may retrieve the server 1 security group 206 configuration using the security group 206 ID. Server 1 security group 206 configuration may include outbound port configurations of server 1 204. Second computing service 112 may retrieve all configurations of all security groups including inbound port configurations which correspond with the outbound port configurations of server 1 204. Second computing service 112 may identify databases associated with the security groups based on security group IDs included in the retrieved security group configurations. The security groups may include database 1 security group 214. Second computing service 112 may use the id of database 1 security group 214 to identify database 1 212 as a consumer of database 1 security group 214 in the configuration of database 1 212. Second computing service 112 may determine that server 1 206 has access to database 1 212. Second computing service 112 may provide the determined information about that server 1 206 has access to database 1 212 to user device 140.

As another non-limiting example, the following query for request for information for a cloud computing resource such as an Elastic Compute Cloud (EC2) (developed by AMA-ZON):

```
account (accountId:"12345678") {
  ec2Instances {
    amiLaunchIndex
    architecture
    instanceId
    hypervisor
    tags {
      key
      value
    }
    cpuOptions {
      coreCount
    }
    blockDeviceMappings {
      deviceName
      ebsVolume {
        volumeId
        tags {
          key
          value
        }
      }
    }
  }
}
```

In the query presented above, the cloud computing account is 12345678. The query is retrieving configuration information for all EC2 instances of the cloud computing account "12345678". The query returns configuration information including amiLaunchIndex, architecture, instanceId, hypervisor, key, value, and coreCount. Furthermore, the query above can return the ebsVolume used by the EC2 instances in the cloud computing account "12345678", where ebsVolume represents a resource distinct from an EC2 instance.

In an embodiment, the system for automatically capturing configuration changes in a cloud computing estate may also provide a WebSocket-style, persistently connected subscription model to broadcast updates reflecting any changes to configuration to specified/selected cloud computing resources to user device 140, via the API gateway 114. For example, user device 140 may subscribe to receive updates on changes to configurations of selected cloud computing resources. The system may subscribe user device 140 to a particular query. In response to the central cloud computing account 100 receiving and storing a change to the configuration to the selected cloud computing resource, the second computing service 112 may continuously execute the query and publish results of the query to the user device 140 and all other similarly subscribed software clients, via the API gateway 114. The user interface of the user device 140 would receive near real-time updates for the configuration changes of one or more cloud computing resources based on a particular query. Alternatively, 112 could subscribe to 108, creating an in-memory cache and by passing the need for regular re-execution against 110.

Figure 3:
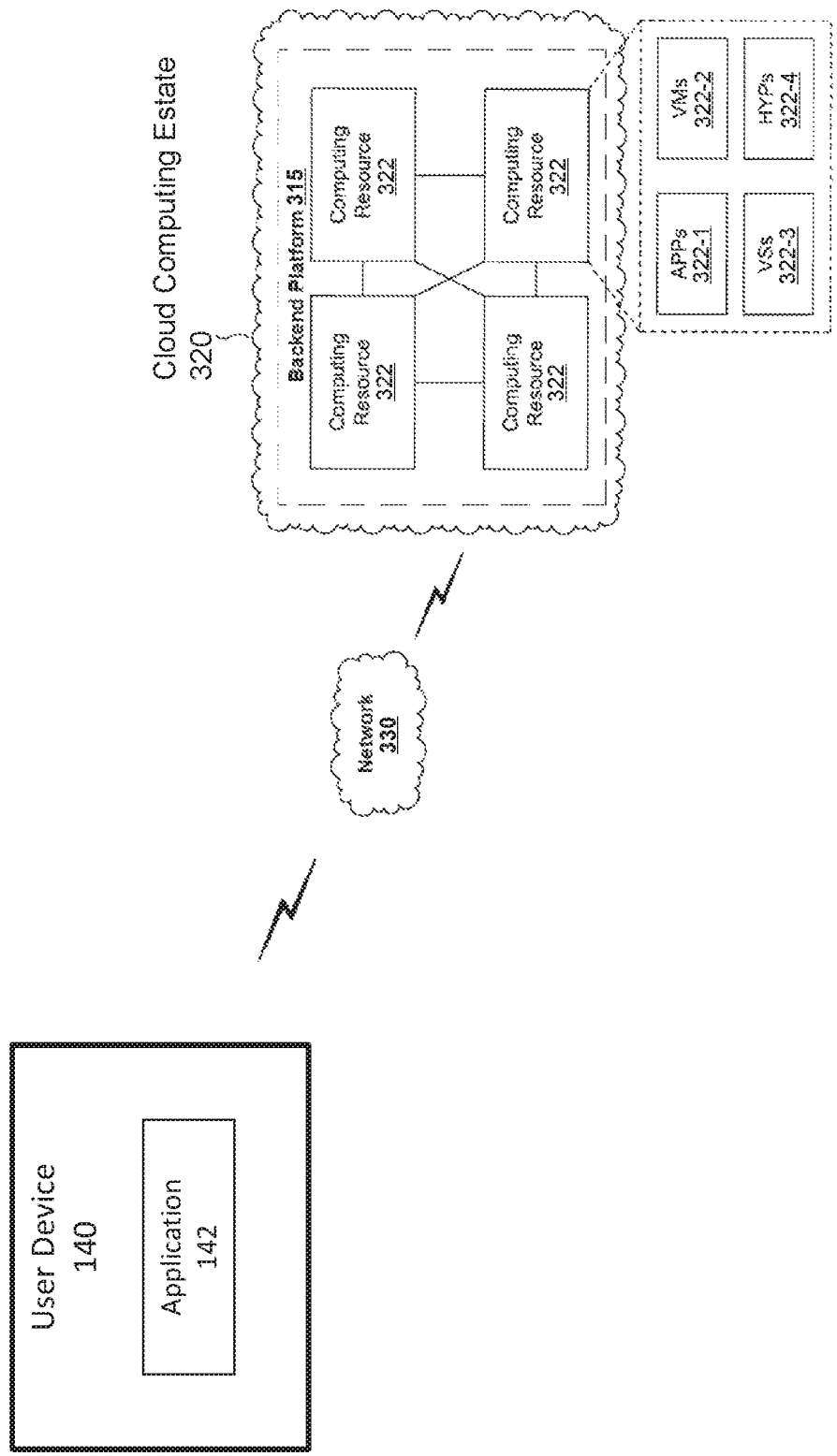
FIG. 3 is a block diagram of an example environment in which systems and/or methods described herein may be implemented.

FIG. 3 is a block diagram of an example environment 300 in which systems and/or methods described herein may be implemented. The environment 300 may include a user device 140, a backend platform 315, a cloud computing estate 320, and a network 330. The devices of the environment 300 may be connected through wired connections, wireless connections, or a combination of wired and wireless connections.

In an example embodiment, one or more portions of the network 330 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The user device 140 may include a communication and/or computing device, such as a desktop computer, mobile device, smartphone, tablet, subnotebook, laptop, personal digital assistant (PDA), gaming device, device integrated with a vehicle, a wearable communication device (e.g., a smart wristwatch, smart eyeglasses, etc.), and/or any other suitable computing device. The user device 140 may execute an application 142 which is configured to communicate with the cloud computing estate 320.

The backend platform 315 may include a server or a group of servers. In an embodiment, the backend platform 315 may be hosted in a cloud computing estate 320. It may be appreciated that the backend platform 315 may not be cloud-based or may be partially cloud-based. In an embodiment, the server or group of servers may interface with the central cloud computing account to query configuration data of cloud computing resources.

The cloud computing estate 320 includes an environment that delivers computing as a service, whereby shared resources, services, etc. may be provided to the user device 140 and/or the backend platform 315. The cloud computing estate 320 may provide computation, software, data access, storage, and/or other services that do not require end-user knowledge of a physical location and configuration of a system and/or a device that delivers the services. The cloud computing system 320 may include computing resources 322.

Each of the cloud computing resources 322 includes one or more personal computers, workstations, computers, server devices, or other types of computation and/or communication devices. The computing resource(s) 322 may host the backend platform 315. The cloud resources may include compute instances executing in the cloud computing resource(s) 322. The cloud computing resource(s) 322 may communicate with other cloud computing resource(s) 322 via wired connections, wireless connections, or a combination of wired or wireless connections.

Cloud computing resource(s) 322 may include a group of cloud resources, such as one or more applications ("APPs") 322-1, one or more virtual machines ("VMs") 322-2, virtualized storage ("VS") 322-3, and one or more hypervisors ("HYPs") 322-4.

Application 322-1 may include one or more software applications that may be provided to or accessed by the user device 140. In an embodiment, the application 322-1 may execute locally on the user device 140. Alternatively, the application 322-1 may eliminate a need to install and execute software applications on the user device 140. The application 322-1 may include software associated with backend platform 315 and/or any other software configured to be provided across the cloud computing estate 320. The application 322-1 may send and/or receive information from one or more other applications 322-1, via the virtual machine 322-2.

Virtual machine 322-2 may include a software implementation of a machine (e.g., a computer) that executes programs like a physical machine. Virtual machine 322-2 may be either a system virtual machine or a process virtual machine, depending upon the use and degree of correspondence to any real machine by virtual machine 322-2. A system virtual machine may provide a complete system platform that supports execution of a complete operating system (OS). A process virtual machine may execute a single program and may support a single process. The virtual machine 322-2 may execute on behalf of a user (e.g., user device 140) and/or on behalf of one or more other backend platforms 315 and may manage infrastructure of cloud computing estate 320, such as data management, synchronization, or long duration data transfers.

Virtualized storage 322-3 may include one or more storage systems and/or one or more devices that use virtualization techniques within the storage systems or devices of cloud computing resource(s) 322. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically stored. This may enable optimization of storage use, server consolidation, and/or performance of non-disruptive file migrations.

Hypervisor 322-4 may provide hardware virtualization techniques that allow multiple operations systems (e.g., "guest operating systems") to execute concurrently on a host computer, such as cloud computing resources 322. Hypervisor 322-4 may present a virtual operating platform to the guest operating systems, may manage the execution of the guest operating systems' multiple instances of a variety of operating systems, and may share virtualized hardware resources.

As described above, the cloud computing estate 320 may include multiple different cloud computing accounts which may utilize different cloud computing resources 322. The listener, rules engine, and first monitoring service instantiated by a cloud computing account may be hosted by the cloud computing estate 320 and may be executed one or more of the cloud computing resources 322. The second monitoring service, rules engine, collection service, first computing service, second computing service, and API gateway instantiated by the central cloud computing account may be hosted by the cloud computing estate 320 and may be executed by one or more of the cloud computing resources 322.

The system for automatically capturing configuration changes may detect changes to configurations of cloud computing resources 322 across the geographic regions, in near real-time. Furthermore, the system for automatically capturing configuration changes may store the changes to the cloud computing resources 322 in a central location such that the current configuration of the cloud computing resources 322 is stored in a data storage device instantiated by a central account. Each of the cloud computing resources 322 may be related to another cloud computing resource 322 (e.g., parent-child relationship). The system for automatically capturing configuration changes may capture the relationships between the different cloud computing resources 322. The cloud computing estate 320 may be hosted by AMAZON Web Services, MICROSOFT AZURE (developed by Microsoft, Inc. of Redmond, Wash.), IBM CLOUD (developed by IBM, Inc. of Armonk, N.Y.), GOOGLE CLOUD PLATFORM (developed by Google, Inc. of Menlo Park), and/or the like. As a non-limiting example, the cloud computing resources 322 may be one or more of: Amazon DynamoDB tables (developed by Amazon.com, Inc. of Seattle, Wash.), Amazon EBS volumes (developed by Amazon.com, Inc. of Seattle, Wash.), Amazon RDS DB instances (developed by Amazon.com, Inc. of Seattle, Wash.), Amazon Elastic MapReduce job flows (developed by Amazon.com, Inc. of Seattle, Wash.), Elastic Load Balancers (developed by Amazon.com, Inc. of Seattle, Wash.), Amazon SQS queues (developed by Amazon.com, Inc. of Seattle, Wash.), Amazon SNS topics (developed by Amazon.com, Inc. of Seattle, Wash.), Amazon EC2 instances (developed by Amazon.com, Inc. of Seattle, Wash.), and/or the like.

Figure 4:
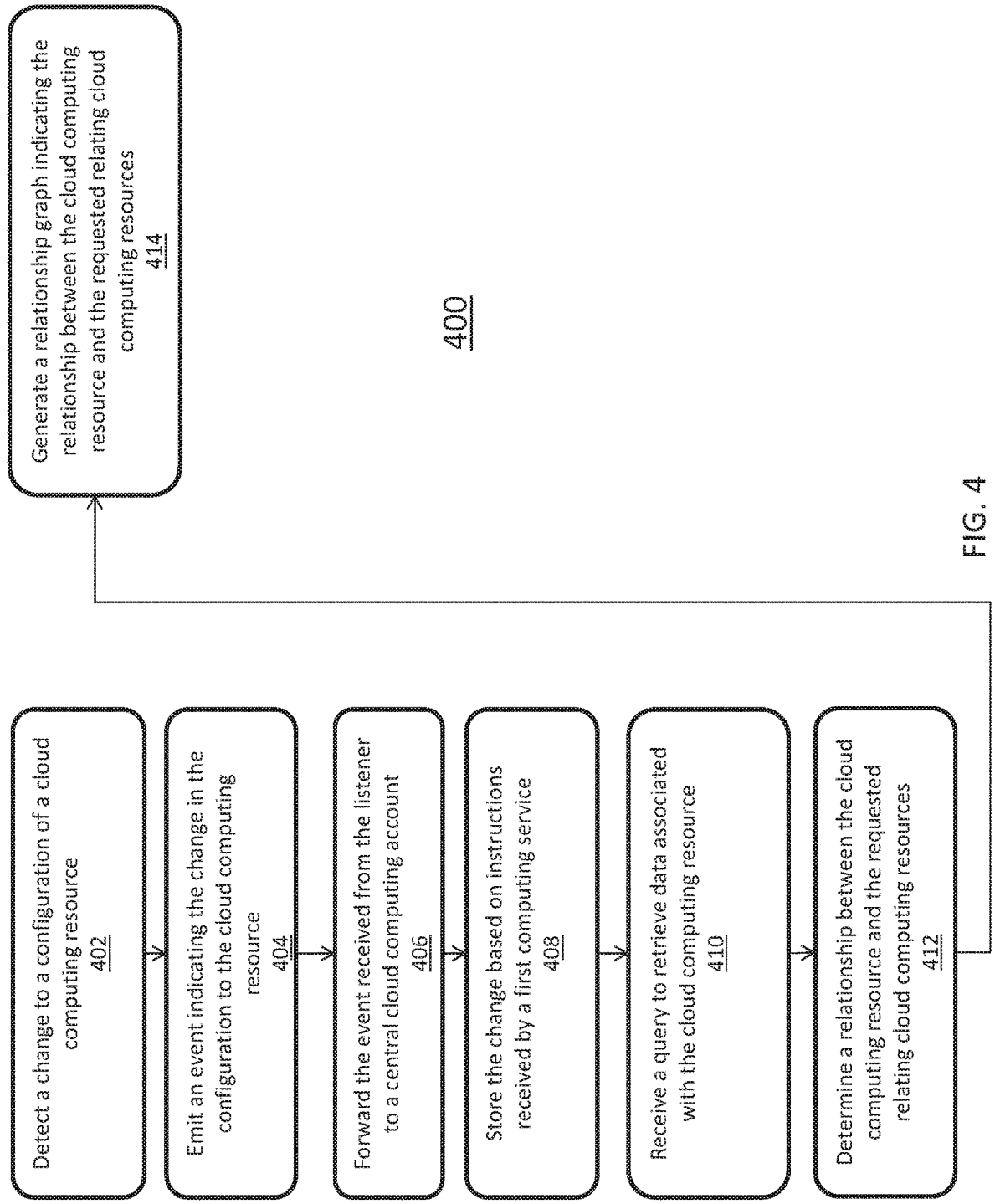
FIG. 4 is a flowchart illustrating a process implemented by a system for automatically capturing configuration changes according to an embodiment.

FIG. 4 is a flowchart 400 illustrating a process implemented by a system for automatically capturing configuration changes according to an embodiment.

Flowchart 400 starts at operation 402. In operation 402, a listener continuously monitoring a cloud computing account of multiple cloud computing resources may detect a change to a configuration of a cloud computing resource utilized by the cloud computing account. The listener may provide the current configuration of any cloud computing resource as needed. The listener may generate a configuration item for each of the cloud computing resources which the listener is monitoring. The configuration item may include metadata, attributes, relationships, current configuration, and related events. The configuration item may include attributes associated with the configuration of the cloud computing resource at a given point in time. The listener may generate a new configuration item each time the configuration of a cloud computing resource changes.

In operation 404, the listener may emit an event indicating the change in the configuration to the cloud computing resource. The event may include the configuration item generated by the listener.

In operation 406, the monitoring service instantiated by the cloud computing account may forward the event received from the listener to a central cloud computing account in communication with each of the cloud computing accounts. The monitoring service may aggregate data from the event received from the listener. The monitoring service may determine that the data indicates a configuration change in a cloud computing resource and may generate an event based on the change in the configuration to the cloud computing resource.

In operation 408, a data storage device may store the change based on instructions received by a first computing service instantiated by the central cloud computing account. The data storage device may store the change in new database tables or existing tables based on the type of configuration change.

In operation 410, an API gateway may receive a query to retrieve data associated with the cloud computing resource from a user device. The query includes a request for information regarding a different cloud computing resource than the cloud computing resource. The different cloud computing resource may be related to the cloud computing resource.

In operation 412, a second computing service instantiated by the central cloud computing account may determine a relationship between the cloud computing resource and the requested relating cloud computing resources.

In operation 414, the second computing service may generate a relationship graph indicating the relationship between the cloud computing resource and the requested relating cloud computing resources. The relationship graph may indicate relationships between the cloud computing resources. The relationship graph may identify the configuration of the cloud computing resource without authenticating against the cloud computing account. The relationship graph may be returned in response to the query.

Figure 5:
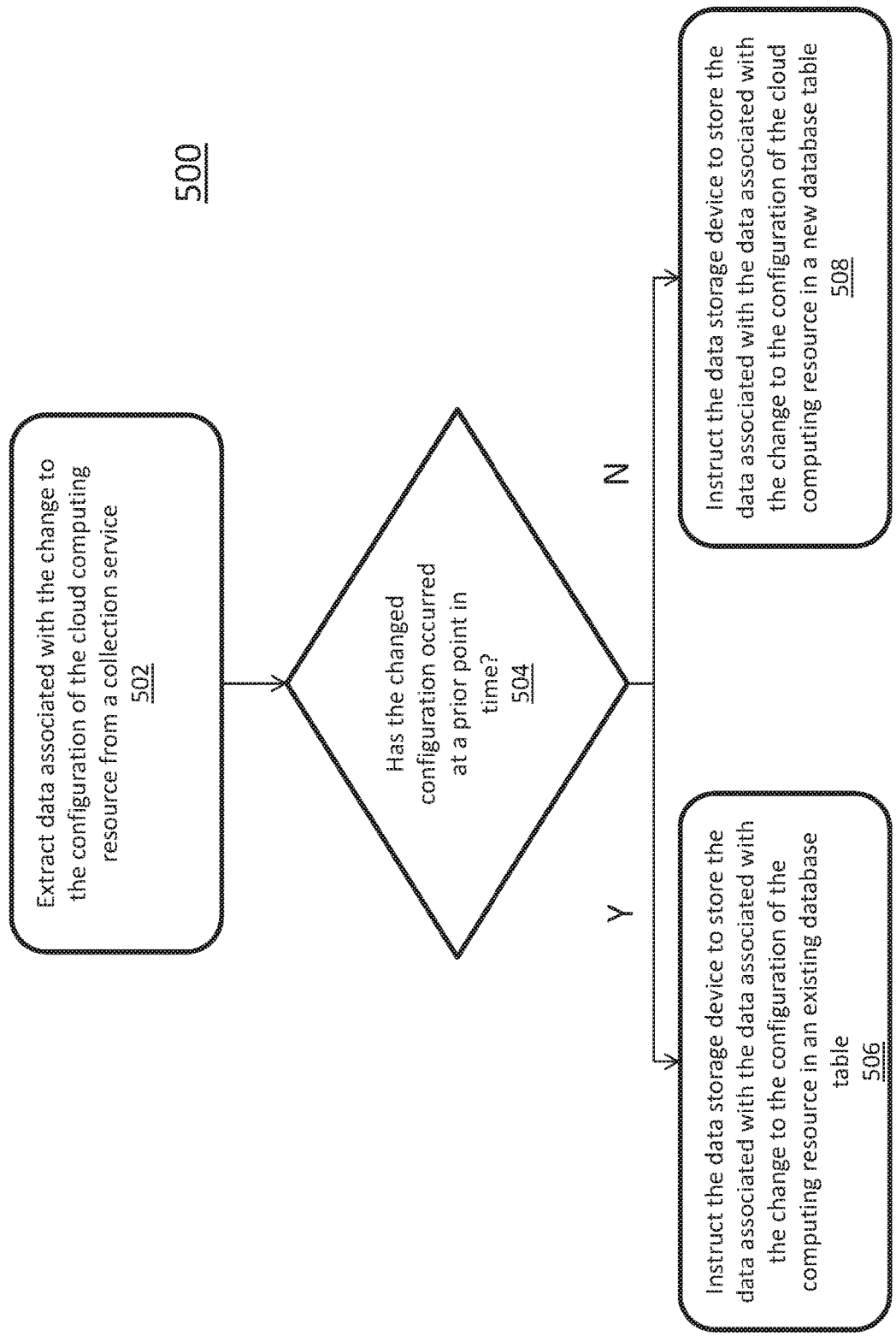
FIG. 5 is a flowchart illustrating a process implemented by a system for a system for automatically capturing configuration changes according to an embodiment.

FIG. 5 is a flowchart 500 illustrating a process implemented by a system for automatically capturing configuration changes according to an embodiment. Flowchart 500 illustrates the process of the storing step as described in FIG. 4 408.

In operation 502, the first computing service instantiated by the central cloud computing account may extract data associated with the change to the configuration of the cloud computing resource from a collection service instantiated by the central cloud computing account. The collection service may receive streams of data in real-time. The collection service may store the streams of data for a specified amount of time. In this regard, the first computing service may check for and extract new data in the collection service on a periodic basis.

In operation 504, the first computing service may determine whether the type of resource of the changed configuration has occurred at a prior point in time. For example, the first computing service may determine whether the configuration of the cloud computing resource was changed in a similar fashion at a prior point in time so that the first computing service may determine whether to store the data in new or existing data tables.

In operation 506, in response to determining that the changed configuration has occurred at prior point in time, the first computing service may instruct the data storage device to store the data associated with the change to the configuration of the one or more cloud computing resources in an existing database table.

In operation 508, in response to determining that the changed configuration has not occurred at a prior point in time, the first computing service may instruct the data storage device to store the data associated with the change to the configuration of the one or more cloud computing resources in a new database table. The original data artifact may be stored in a JSON or JSONB format. The data can be sharded or partitioned to improve lookups while preserving the original artifact for complete reference.

Figure 6:
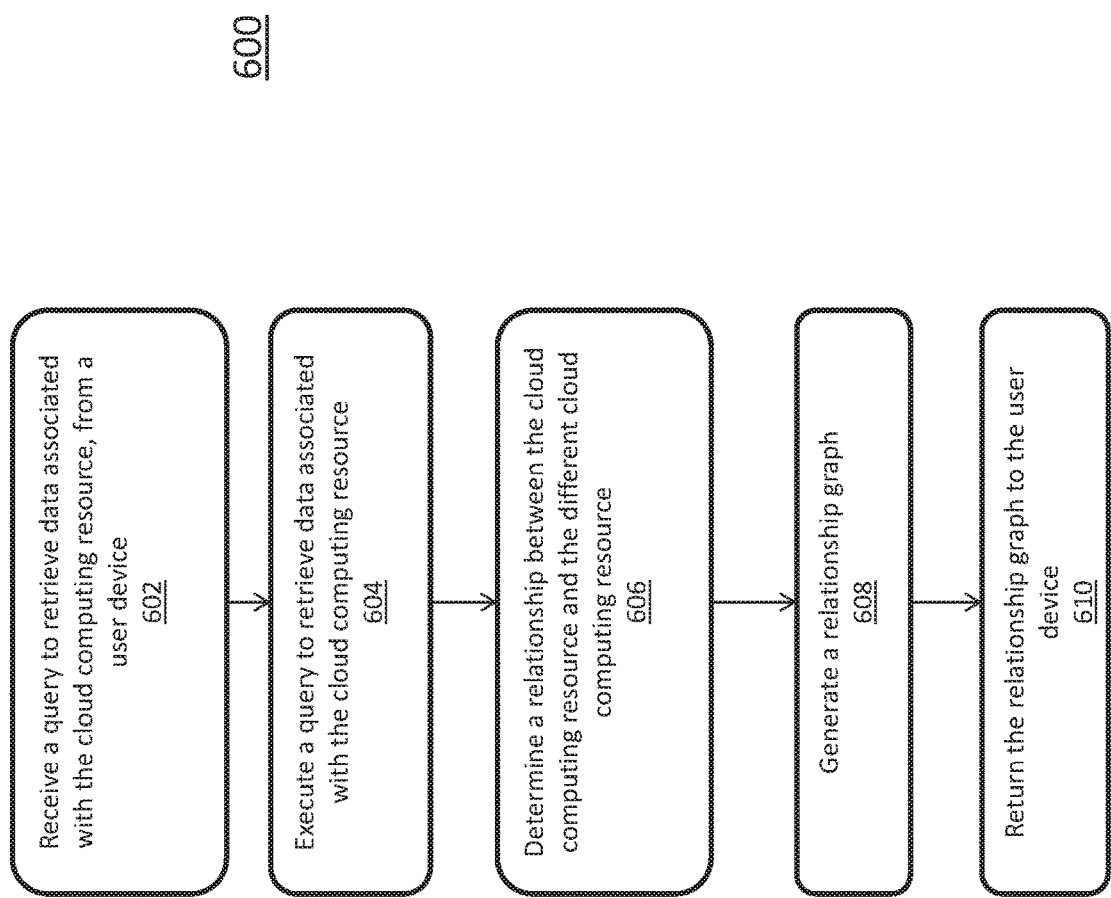
FIG. 6 is a flowchart illustrating a process implemented by a system for a system for automatically capturing configuration changes according to an embodiment.

FIG. 6 is a flowchart 600 illustrating a process implemented by a system for automatically capturing configuration changes according to an embodiment.

In operation 602, an Application Program Interface (API) gateway may receive a query from a user device to retrieve data associated with a cloud computing resource. The query may include a request for information regarding a different cloud computing resource other than a cloud computing resource defined in the submitted request.

In operation 604, the second computing service may execute a query to retrieve data associated with the cloud computing resource. The second computing system may generate several subsequent queries to retrieve data regarding the cloud computing resource. For example, the second computing service may retrieve an ID of the cloud computing resource by querying the configuration of the different cloud computing resource. The second computing service may execute a query using the ID of the cloud computing resource to retrieve data associated with the cloud computing resource.

In operation 606, the second computing service may determine a relationship between the cloud computing resource and the different cloud computing resource.

In operation 608, the second computing service may generate a relationship graph. The relationship graph may indicate the relationships between the cloud computing resource and the different cloud computing resource. The relationship graph may indicate the configuration of the cloud computing resource. The second computing system may generate the relationship graph using the information retrieved from each of the subsequent queries.

In operation 610, the API gateway may return the relationship graph to the user device. The relationship graph may include the requested data associated with the cloud computing resource. In an embodiment, the API gateway may also return the requested data associated with the cloud computing resource to the user device.

Figure 7:
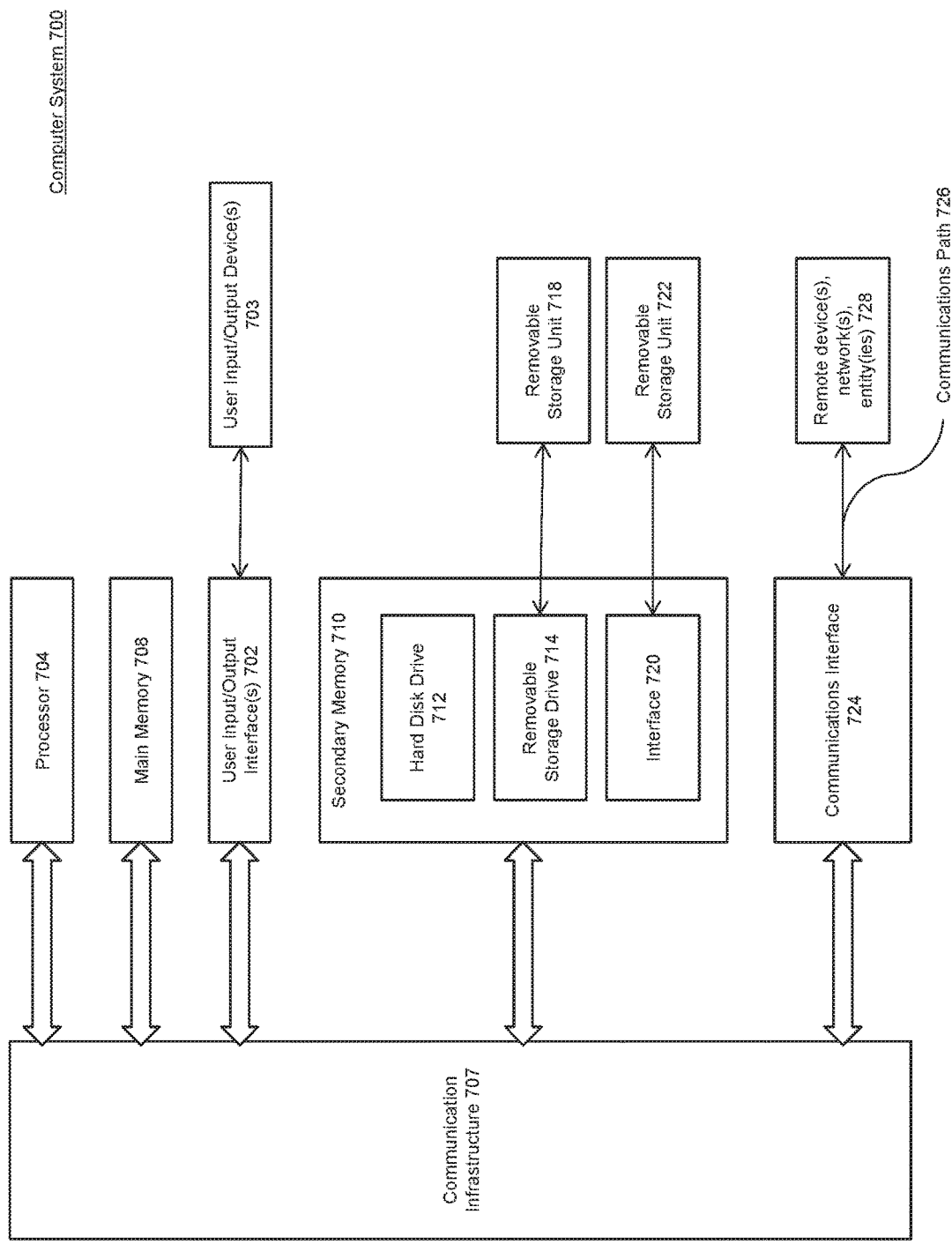
FIG. 7 is a block diagram of example components of a device according to an embodiment.

FIG. 7 is a block diagram of example components of computer system 700. One or more computer systems 700 may be used, for example, to implement any of the embodiments discussed herein, as well as combinations and sub-combinations thereof. Computer system 700 may include one or more processors (also called central processing units, or CPUs), such as a processor 704. Processor 704 may be connected to a communication infrastructure or bus 707.

Computer system 700 may also include user input/output interface(s) 702, such as monitors, keyboards, pointing devices, etc., which may communicate with communication infrastructure 707 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage drive 714.

Removable storage drive 714 may interact with a removable storage unit 718. Removable storage unit 718 may include a computer usable or readable storage device having stored thereon computer software (control logic) and/or data. Removable storage unit 718 may be a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer, and the cited references that it was made to avoid, may need to be revisited. Further, the Examiner is also reminded that any disclaimer made in the instant application should not be read into or against the parent application.

What is claimed is:

1. A method for automatically capturing configuration changes in a cloud computing environment, the method comprising:
   detecting, by a listener continuously monitoring a cloud computing account of a plurality of cloud computing accounts, a change to a configuration of a cloud computing resource of a plurality of cloud computing resources utilized by the plurality of cloud computing accounts;
   emitting, by the listener, an event indicating the change to the configuration of the cloud computing resource;
   forwarding, by a monitoring service, the event from the listener to a central cloud computing account in communication with each of the plurality of cloud computing accounts;
   storing, by a data storage device instantiated by the central cloud computing account, the change based on instructions received by a first computing service instantiated by the central cloud computing account;
   receiving, via an Application Program Interface (API) gateway, a query to retrieve data associated with the cloud computing resource, from a user device, wherein the query includes information regarding a different cloud computing resource than the cloud computing resource;

determining, by a second computing service instantiated by the central cloud computing account, a relationship between the cloud computing resource and the different cloud computing resource; and generating, by the second computing service, a relationship graph indicating the relationship between the cloud computing resource and the different cloud computing resource, wherein the relationship graph is able to identify the configuration of the cloud computing resource without authenticating against the cloud computing account, wherein the listener, monitoring service, and first and second computing services are each implemented on a computing device comprising a processor and memory.

2. The method of claim 1, wherein the second computing service generates subsequent queries in response to receiving the query from the user device to generate the relationship graph.

3. The method of claim 1, wherein prior to storing the change in the data storage device, the method further comprising:

extracting, by the first computing service, data associated with the change to the configuration of the cloud computing resource from a collection service instantiated by the central cloud computing account; and determining, by the first computing service, whether the changed configuration has occurred at a prior point in time.

4. The method of claim 3, wherein in response to determining the changed configuration has occurred at prior point in time, the method further comprising:

instructing, by the first computing service, the data storage device to store the data associated with the change to the configuration of the cloud computing resource in an existing data store collection related to a type of the cloud computing resource type.

5. The method of claim 4, wherein in response to determining the changed configuration has not occurred at prior point in time, the method further comprising:

instructing, by the first computing service, the data storage device to store the data associated with the change to the configuration of the cloud computing resource in a new data store collection related to the type of the cloud computing resource.

6. The method of claim 1, wherein the relationship graph is generated in response to receiving the query.

7. The method of claim 6, further comprising returning, by the API gateway, the relationship graph to the user device.

8. A system for automatically capturing configuration changes in a cloud computing environment, the system comprising:

a memory;
a processor communicatively coupled to the memory;
a cloud computing system including a plurality of cloud computing resources executed by the processor;
a plurality of cloud computing accounts of the cloud computing system, each cloud computing account of the plurality of cloud computing accounts instantiating a listener continuously monitoring a specified cloud computing account of the plurality of cloud computing accounts, and a first monitoring service; and a central cloud computing account of the cloud computing system, in communication with each of the plurality of cloud computing accounts, the central cloud computing account instantiating a second monitoring service, a collection service, a first computing service, a second computing service, a data storage device, and an API gateway, the central computing account is configured to:

receive, by the second monitoring service, an event indicating a change to a configuration of a cloud computing resource of the plurality of resources from the first monitoring service;

store, by the data storage device, the change based on instructions received by the first computing service;

receive, via the API gateway, a query to retrieve data associated with the cloud computing resource, from a user device, wherein the query includes information regarding a different cloud computing resource than the cloud computing resource;

determine, by the second computing service, a relationship between the cloud computing resource and the different cloud computing resource;

generate, by the second computing service, a relationship graph indicating the relationship between the cloud computing resource and the different cloud computing resource, wherein the relationship graph is able to identify the configuration of the cloud computing resource; and return, by the API gateway, the relationship graph to the user device.

9. The system of claim 8, wherein the second computing service generates subsequent queries in response to receiving the query from the user device to generate the relationship graph.

10. The system of claim 8, wherein prior to storing the change, the central cloud computing account is configured to:

extract, by the first computing service, data associated with the change to the configuration of the cloud computing resource from the collection service instantiated with the central cloud computing account; and determine, by the first computing service, whether the changed configuration has occurred at a prior point in time.

11. The system of claim 10, wherein in response to determining that the changed configuration has occurred at a prior point in time, the central cloud computing account is configured to:

instruct, by the first computing service, the data storage device to store the data associated with the change to the configuration of the cloud computing resource in an existing data store collection related to a type of the cloud computing resource type.

12. The system of claim 11, wherein in response to determining that the changed configuration has not occurred at prior point in time, the central cloud computing account is configured to:

instruct, by the first computing service, the data storage device to store the data associated with the change to the configuration of the cloud computing resource in a new data store collection related to the type of the cloud computing resource.

13. The system of claim 8, wherein the data associated with any one of the plurality of cloud computing resources is indicative of relationships to other cloud computing resources of the plurality of cloud computing resources.

14. The system of claim 8, wherein the relationship graph is able identify the configuration of the cloud computing resource without authenticating against the cloud computing account.

15. A non-transitory computer readable medium storing instructions that when executed by one or more processors of a device cause the one or more processors to:
  detect, by a listener continuously monitoring a cloud computing account of a plurality of cloud computing accounts, a change to a configuration of a cloud computing resource of a plurality of cloud computing resources utilized by the plurality of cloud computing accounts;
  emit, by the listener, an event indicating the change to the configuration of the cloud computing resource;
  forward, by a monitoring service, the event from the listener to a central cloud computing account in communication with each of the plurality of cloud computing accounts;
  store, by a data storage device instantiated by the central cloud computing account, the change based on instructions received by a first computing service instantiated by the central cloud computing account;
  receive, via an API gateway, a query to retrieve data associated with the cloud computing resource, from a user device, wherein the query includes information regarding a different cloud computing resource than the cloud computing resource;
  determine, by a second computing service, a relationship between the cloud computing resource and the different cloud computing resource;
  generate, by the second computing service, a relationship graph indicating the relationship between the cloud computing resource and the different cloud computing resource, wherein the relationship graph is able to identify the configuration of the cloud computing resource without authenticating against the cloud computing account; and
  return, by the API gateway, the relationship graph to the user device.

16. The non-transitory computer readable medium of claim 15, wherein the second computing service generates subsequent queries in response to receiving the query from the user device to generate the relationship graph.

17. The non-transitory computer readable medium of claim 15, wherein the instructions when executed by the one or more processors, further cause the one or more processors to:
  determine, via the second computing service associated with the central cloud computing account, whether any other cloud computing accounts of the plurality of cloud computing accounts other than the cloud computing account are affected by a proposed change to the configuration of the cloud computing resource.

18. The non-transitory computer readable medium of claim 15, wherein prior to storing the change, the instructions when executed by the one or more processors, further cause the one or more processors to:
  extract, by the first computing service, data associated with the change to the configuration of the cloud computing resource from a collection service associated with the central cloud computing account; and
  determine, by the first computing service, whether the changed configuration has occurred at a prior point in time.

19. The non-transitory computer readable medium of claim 18, wherein in response to determining that the changed configuration has occurred at a prior point in time, the instructions when executed by the one or more processors, further cause the one or more processors to:
  instruct, via the first computing service, the data storage device to store the data associated with the change to the configuration of the cloud computing resource in an existing data store collection related to a type of the cloud computing resource.

20. The non-transitory computer readable medium of claim 19, wherein in response to determining that the changed configuration has not occurred at a prior point in time, the instructions when executed by the one or more processors, further cause the one or more processors to:
  instruct, via the first computing service, the data storage device to store the data associated with the change to the configuration of the cloud computing resource in a new data store collection related to the type of the cloud computing resource.

* * * * *